United States Patent Office 3,769,251
Patented Oct. 30, 1973

3,769,251
PROCESS FOR THE PREPARATION OF AQUEOUS STYRENE/ACRYLIC ACID ESTER COPOLYMER DISPERSIONS
Hubert Wiest, Eduard Bergmeister, and Paul-Gerhard Kirst, Burghausen, and Christian Schmidkonz, Pocking, Germany, assignors to Wacker-Chemie G.m.b.H., Munich, Germany
No Drawing. Filed Nov. 30, 1971, Ser. No. 203,435
Claims priority, application Germany, Dec. 9, 1970, P 20 60 670.6
Int. Cl. C08f 1/13
U.S. Cl. 260—29.6 TA         7 Claims

ABSTRACT OF THE DISCLOSURE

The present invention provides a process for the preparation of an aqueous dispersion of styrene/acrylate ester mixed polymers substantially free of noxious odors consisting essentially of the steps of polymerizing an initial mixture of from 20% to 70% by weight of styrene monomer and from 80% to 30% by weight of a monomer component for a time sufficient for the residual monomer content to fall below 3% by weight of the initial monomer content, thereafter adjusting the pH to between 3 and 7 and adding from 0.2% to 10% by weight, based on the weight of the polymerizate, of a vinyl ester of an alkanoic acid having 1 to 3 carbon atoms, after-polymerizing the mixture at a temperature of from 50° C. to 100° C. for a time sufficient to reduce said residual monomer content below 0.35% by weight, and recovering said aqueous dispersion of styrene/acrylate ester mixed polymers substantially free of noxious odors.

BACKGROUND OF THE INVENTION

This invention is directed to aqueous dispersions of copolymerizates made from styrene and from esters of the acrylic acid, with the styrene content being from 20–70% by weight. These copolymerizates are widely used as adhesives for coating substances. They possess the properties of having a high resistance to abrasion, to attack by water, and to saponification.

Such dispersions can be prepared in one operation by emulsion polymerization of the monomers in the presence of aqueous solutions of emulsifiers and/or protective colloids with radical formers. The disadvantage of these dispersions is, that they possess an intensive, long-lasting odor that impairs the application in closed rooms; besides the odor of acrylic esters of short-chain alcohols is toxic. The mentioned odor and annoyance is derived from unreacted monomers and oligomers.

A number of measures to reduce the odor of the styrene/acrylic ester-copolymer dispersions have been known in the prior art. Thus, it is, for example, possible, after the termination of the polymerization, to heat the dispersion for a longer time at a higher temperature with a renewed addition of radical formers. This measure is not very effective; besides crust formation occurs.

It was thought that a reduction of the odor could be attained by the introduction of steam at normal or reduced pressure. The success of this measure is also limited. The dispersions tended to be high foaming and the formation of a coagulate also resulted.

It is also known to free the dispersions of the monomers by distilling them in a thin-layer evaporator. However the technical expense is high; and undesirable crusts and coagulates are formed.

Another proposal, finally, is, to saponify the residual monomers. Thereby the odor of the acrylic esters is indeed removed, but not that of styrene. Also in this case a coagulate formation occurs.

OBJECTS OF THE INVENTION

It is therefore an object of the present invention to provide an improved process for the preparation of an aqueous dispersion of styrene/acrylate ester mixed polymers that are substantially free of noxious odors.

It is another object of the present invention to provide a process for the preparation of an aqueous dispersion of styrene/acrylate ester mixed polymers substantially free of noxious odors consisting essentially of the steps of polymerizing an initial mixture of from 20% to 70% by weight of styrene monomer and from 80% to 30% by weight of a monomer component consisting of from 40% to 100% by weight of acrylic acid esters with alkanols having 1 to 18 carbon atoms, from 0 to 60% by weight of diesters of alkenedioic acids having 4 to 8 carbon atoms with alkanols having 1 to 18 carbon atoms, and from 0 to 5% by weight of water-soluble $\alpha,\beta$-unsaturated monomers copolymerizable with said styrene and said acrylic acid esters, in the presence of water and dispersants selected from the group consisting of emulsifiers, protective colloids and mixtures thereof, under free-radical polymerization conditions at temperatures of from 0° C. to 100° C., for a time sufficient for the residual monomer content to fall below 3% by weight of the initial monomer content, thereafter adjusting the pH to between 3 and 7 and adding from 0.2% to 10% by weight, based on the weight of the polymerizate, of a vinyl ester of an alkanoic acid having 1 to 3 carbon atoms, after-polymerizing the mixture at a temperature of from 50° C. to 100° C. for a time sufficient to reduce said residual monomer content below 0.35% by weight, and recovering said aqeous dispersion of styrene/acrylate ester mixed polymers substantially free of noxious odors.

Other and further objects of the present invention will become apparent as the description thereof proceeds.

DESCRIPTION OF THE INVENTION

The preseint invention provides a process for the preparation of an aqueous dispersion of styrene/acrylate ester mixed polymers substantially free of noxious odors consisting essentially of the steps of polymerizing an initial mixture of from 20% to 70% by weight of styrene monomer and from 80% to 30% by weight of a monomer component consisting of from 40% to 100% by weight of acrylic acid esters with alkanols having 1 to 18 carbon atoms, from 0 to 60% by weight of diesters of alkenedioic acids having 4 to 8 carbon atoms with alkanols having 1 to 18 carbon atoms, and from 0 to 5% by weight of water-soluble $\alpha,\beta$-unsaturated monomers copolymerizable with said styrene and said acrylic acid esters, in the presence of water and dispersants selected from the group consisting of emulsifiers, protective colloids and mixtures thereof, under free-radical polymerization conditions at temperatures of from 0° C. to 100° C., for a time sufficient for the residual monomer content to fall below 3% by weight of the initial monomer content, thereafter adjusting the pH to between 3 and 7 and adding from 0.2% to 10% by weight, based on the weight of the polymerizate, of a vinyl ester of an alkanoic acid having 1 to 3 carbon atoms, after-polymerizing the mixture at a temperature of from 50° C. to 100° C. for a time sufficient to reduce said residual monomer content below 0.35% by weight, and recovering said aqueous dispersion of styrene/acrylate ester mixed polymers substantially free of noxious odors.

As described herein, a process was found for the preparation of aqueous dispersions of mixed polymers from 20–70% by weight of styrene and 80–30% by weight of acrylic acid esters of alkanols having 1–18 carbon atoms, preferably 2–8 carbon atoms, whereby the initial acrylic acid esters can be replaced, from 0 to 60% by weight, by diesters of alkenedioc acids having 4 to 8 carbon atoms with alkanols having 1–18 carbon atoms, preferably 2–8 carbon atoms. Furthermore the initial acrylic acid esters can be replaced, from 0 to 5% by weight, by water soluble $\alpha,\beta$-unsaturated monomers copolymerizable with styrene. The polymerization may be carried out by free-radical polymerization in the presence of emulsifiers and/or protective colloids at temperatures between 0° C. and 100° C. The process provides that after the content of residual monomers has fallen to about below 3, preferably 2% by weight, based on the total monomer amount, the pH of the emulsion is adjusted to a range of from 3–7. Then a vinyl ester of alkanoic acids having 1 to 3 carbon atoms is added to the polymerization mixture in an amount from 0.2% to 10%, preferably 0.5% to 4% by weight, based on the polymerizate. Then the temperature is adjusted to a range of from 50–100° C. and the afterpolymerization occurs.

As a result of this after-polymerzation with vinyl esters it is possile to render the dispersions in a simple way practically odorless, so that in the further processing of the copolymer, no annoyance by the odor occurs. The content of residual monomers, based on styrene, is thereby reduced to below 0.35% by weight and less. Besides no coagulation- or crust formation occurs. Moreover, the beneficial properties of the styrene/acrylic acid ester-copolymerizate dispersion, such as resistance to abrasion, to attack by water, and to saponification, are not affected by the slight portion of vinyl esters.

If the vinyl ester is added to the initial mixture of the polymerization charge or during the polymerization, when the content of monomers is still larger than about 3% by weight, the desired odor-reducing effect does not take place.

As a suitable vinyl ester vinyl acetate is operable; but vinyl formate and vinyl propionate can also be used. The copolymerization is carried out by known processes, whereby both anionic and/or nonionic emulsifiers and also protective colloids in total amounts from 2–10% by weight, based on the monomers, can be utilized.

Suitable anionic emulsifiers are, for instance, alkylsulfonates, alkylarylsulfonates, alkylsulfates, sulfates and hydroxyalcohols, salts of sulfosuccinic acid esters, sulfates of alkylphenoxyethoxyethanols.

Nonionic emulsifiers are, for example, reaction products of from 5–50 mols ethylene oxide and/or propylene oxide with straight-chain or branched alkylalcohols, alkylphenols, carboxylic acids and carboxylic acid amides of primary and secondary amines as well as block copolymerizates of propylene oxide with ethylene oxide.

As protective colloids are suitable, for example, polyvinyl alcohols, partially acylated polyvinyl alcohols, water soluble cellulose derivatives, such as hydroxyethy-, carboxomethyl-, hydroxypropyl- or methylcellulose, polyacrylic acid or water soluble copolymerizates of acrylic acid with acrylamide and/or alkylesters and poly-N-vinyl compounds of open-chain or cyclic carboxylic acid amides.

The initiation of the polymerization reaction may be carried out by water soluble, free-radicals forming substances, such as percompounds, such as potassium-, sodium- or ammonium peroxydisulfates, perborates, hydrogen peroxide and tertiary butylhydroperoxide. In certain cases it may be appropriate, if besides also oil soluble peroxides, such as benzoylperoxide, diacetylperoxide or azoisobutyric acid dinitrile are added. The percompounds may be also applied in the form of redox systems, that is, in combination with reducing agents, optionally in combination with heavy metal salts, in a known manner. Suitable reducing agents are, e.g., sodium sulfite, sodium bisulfite, sodium dithionite, sodium formaldehyde sulfoxylate or aliphatic amines.

The initiators are charged in amounts from 0.02–2% by weight.

Also regulators may be added to the polymerization charge at the start or during the polymerization, such as aliphatic aldehydes, organic nitrocompounds, aliphatic mercaptans or chlorohydrocarbons.

Suitable acrylic esters are obtainable from alkanols having 1–18 carbon atoms, preferably 2–8 carbon atoms, such as ethanol, propanol, n-butanol, tertiary butanol, 2-ethylhexanol, octanol, dodecyl-, octadodecyl- or isotridecylalcohol. A portion of acrylic acid esters in the initial total monomers may, however, also be replaced from 0 to 60% by weight by diesters from alkenedioic acids having 4 to 8 carbon atoms with alkanols having 1–18 carbon atoms, preferably 2–8 carbon atoms, such as fumaric-, maleic- or itaconic acid esters. Preferably fumaric acid dialkylesters are used. Suitable alkanols are those listed above.

Additional ingredients may replace some of the initial acrylic acid esters. For example, from 0 to 5% by weight, calculated from the total monomer content, of water soluble $\alpha,\beta$-unsaturated monomers, such as acrylic acid or methacrylic acid, acrylamide or methacrylamide, N-methlyolacrylamide or N-methylolmethacrylamide, vinylsulfonic acid, fumaric acid, maleic acid, itaconic acid or half esters or half amides of these acids or mixtures of these monomers. The named water soluble copolymerizable unsaturated acids may be used as such or in the form of water soluble salts.

The addition of the monomers can be done in various ways. Thus, for instance, all monomers may be pre-emulsified in an aqueous emulsifier solution and then the whole mixture be charged or only a part of the mixture be charged and the residual mixture added in portions. It is also possible to pre-emulsify only a part of the monomers in the emulsifier solution and to add in portions the residual monomers singly or as a mixture, whereby the proportion of the monomers to each other may be adjusted according to their reactivities. Also, the charged portion of monomers may be pre-emulsified with different emulsifiers or emulsifier portions as the monomer portion to be measured out.

The pH-value of the polymerization charge is to be between 2 and 10. This can be attained by the addition of buffer substances, such as bicarbonates, carbonates, phosphates, borates, acids, for instance hydrochloric acid, acetic acid, bases, such as ammonia, sodium hydroxide, potassium hydroxide before or during the polymerization.

The charge is polymerized at temperatures between 0° C. and 100° C., preferably 40° C. to 90° C., depending upon the catalyst system, until less than about 3% by weight, preferably less than 2% by weight, calculated from the total monomers, of residual monomers are present. Then the vinyl ester or a mixture of vinyl esters, in amounts from 0.2–10% by weight, preferably 0.5–4% by weight, based on the polymerizate, are added and the polymerization continued from 1–10 hours, preferably 2–5 hours, at 50° C.–100° C., preferably 75° C.–90° C. The pH value is maintained in a range between 3 and 7, preferably between 4 and 5. Optionally these values are attained by the addition of buffer salts, acids or bases.

The time for the addition of vinyl ester can be determined by the known double-bond estimations, such as with pyridine sulfate dibromide (cf. Acryl- und Methacryl-verbindungen, Rauch-Puntigam, Springer-Verlag, 1967, page 132), by solid-content determination, or by determination of the content of residual monomers by gas chromatography.

In many cases a one-time determination of the polymerization time is sufficient to calculate when the amount of residual monomers has fallen below 3% by weight. The addition of the vinyl esters may be done all at once or gradually in doses. Also the vinyl esters may be added alone or may be emulsified in water together with the named emulsifiers or protective colloids.

Besides during the after-polymerization step with vinyl esters, further radical formers may be added. Often this is done simply by continuation of the dosing of the catalyst during the main polymerization. If, however, larger amounts of the radical formers have been added already at the beginning of the polymerization, additional amounts are often no longer required.

The polymerization is usually carried out in water-cooled reaction vessels that are generally equipped with stirring devices and deflecting plates. The process may also be carried out continuously, if the content of residual monomers of the dispersion, after the emergence of the polymer dispersion from the polymerization reactor is below 3% and if the after-polymerization step with the vinyl esters is arranged successively.

The dispersions prepared by the claimed process are suitable for coatings and plastering on masonry and wood and as binders for fibrous substances (textile fleeces, cellulose fibers, leather cuttings), are further suitable for the preparation of coating materials for paper, leather, wood, sound absorbers, fillers, as adhesives, as well as being suitable additions to hydroulic hardening substances and as soil improvement agents.

The present invention will be further described with reference to the following specific examples which are not to be deemed limitative of the invention.

Example 1 (comparison)

A 2-liter stirring apparatus is utilized with a heating jacket, a cooling jacket, a nitrogen feed line, dosing devices and a reflux condenser. Into this apparatus are introduced 3 gm. of "Mersolat K 30" (trademark for sulfonated alkanes), 32 gm. of nonylphenolpolyethylene glycol with 20 mols of ethylene oxide, 1 gm. of vinyl sulfonate, 1.8 gm. of potassium persulfate, 6 gm. of acrylic acid and 6 gm. of acrylamide, dissolved in 580 gm. of water. Then air and oxygen are removed from the apparatus by passing a stream of nitrogen therethrough. Into this solution a mixture of 300 gm. of styrene and 300 gm. of butyl acrylate is stirred and the polymerizate mixture heated to 65° C. At 65° C. the addition of 1 gm. of sodium bisulfite in 70 ml. of water is started, and is continued for 5 hours. The temperature of the reaction medium is kept at 65° C. by cooling or heating. The residual content of monomers after 5 hours amounts to 1.7% by weight. The pH value is adjusted by the addition of 30% ammonia to 4.5. The reaction temperature is raised to 85° C. for 3 more hours and 1 gm. of ammonium persulfate is added.

Now, the mixture is cooled and the pH value adjusted to 7 with ammonia. A finely divided dispersion, free of coagulate is obtained that exhibits an intensive odor. The content of monomers, determined by the double-bond method, is 1.2%.

Example 2

The reaction is carried out as in Example 1, but after 4 hours, when the monomer content, by the double-bond determination, had fallen to 2.2%, the pH value is adjusted to 4.5 with 30% ammonia, and then during 1 hour 12 gm. of vinyl acetate are added and the temperature is raised to 85° C. for another 3 hours. Then the mixture is cooled, and the pH adjusted with ammonia to 7. A finely-divided stable dispersion, free of coagulate with a 50% solids content is obtained. The dispersion is practically odorless. The content of residual monomers by the double-bond determination is 0.35%.

Example 3 (comparison)

The reaction is carried out as in Example 1, only together with the mixture of 300 gm. of styrene and 300 gm. of butyl acrylate, 12 gm. of vinyl acetate are added at the start. Only a partial polymerization of the monomers is obtained. The content of residual monomers is above 20% by weight.

Example 4 (comparison)

In a reaction vessel, as described in Example 1, 10 gm. of "Mersolat K 30," 20 gm. of an addition product of 15 mols of ethylene oxide to isotridecyl alcohol, 1 gm. of vinyl sulfonate, 0.8 gm. of potassium persulfate, 6 gm. of acrylic acid and 6 gm. of acrylamide are dissolved in 300 gm. of water. Air and oxygen are removed by passing a stream of nitrogen through the reaction vessel. Then a mixture of 60 gm. of styrene and 60 gm. of butyl acrylate is stirred in and the mixture heated to 80° C. under nitrogen. Fifteen minutes after the mixture temperature had reached 80° C., an aqueous, pre-emulsion of the residual monomer mixture is continuously dosed in over a period of 3 hours. This pre-emulsion was prepared in another stirring vessel under a nitrogen atmosphere and consists of a solution of 12 gm. of an addition product of 15 mols of ethylene oxide to isotridecylalcohol in 300 gm. of water, into which a mixture of 240 gm. of styrene and 240 gm. of butyl acrylate were emulsified. Simultaneously added with the pre-emulsion is a solution of 1 gm. of potassium persulfate and 0.8 ml. of 30% ammonia in 60 gm. of water which is dosed in over a period of 6 hours, in order to maintain a pH value between 4 and 5. Eight hours after the reaction temperature was reached the mixture is cooled and the pH adjusted to 7. The stable dispersion has a strong specific odor. The content of residual monomers was 1.0% by weight. By successive evacuation for 3 hours under agitation, the content of residual monomers was reduced only to 0.7% by weight. The odor of the dispersion was not noticeably reduced.

Example 5

The procedure was identical to that in Example 4. Two hours after terminating the dosing in of the aqueous pre-emulsion, and when the content of residual monomers had fallen to 1.3% by weight, 15 gm. of vinyl acetate were added to the mixture over a period of 1 hour. Then the temperature is maintained at 80° C. for aonther 4 hours. The mixture is then cooled to room temperature and the pH adjusted to 7. A stable dispersion, free of coagulates, is obtained, that shows only a weak specific odor. The content of residual monomers was 0.15% by weight.

Example 6

In a reaction vessel, as described in Example 1, 10 gm. of "Mersolat K 30," 20 gm. of an octylphenolpolyethyleneglycol ether with 23 mols of ethylene oxide, 1 gm. of vinyl sulfonate, 0.8 gm. of potassium persulfate, 9 gm. of acrylic acid and 5 gm. of acrylamide are dissolved in 300 gm. of water. Air and oxygen are removed by passing a stream of nitrogen through the reaction vessel. Then a mixture of 65 gm. of styrene, 30 gm. of butyl acrylate and 25 gm. of diethylhexyl fumarate is stirred in and heated under nitrogen to 80° C. Fifteen minutes after the mixture temperature had reached 80° C., and aqueous pre-emulsion of the residual monomer mixture is dosed in during 2 hours. This pre-emulsion was prepared in another stirring vessel under a nitrogen atmosphere and consists of a solution of 12 gm. of an addition product of 15 mols of ethylene oxide to isotridecyl alcohol in 300 gm. of water, into which a mixture of 260 gm. of styrene, 120 gm. of butyl acrylate and 100 gm. of diethyl fumarate was emulsified. Simultaneously with the addition of the pre-emulsion a solution of 1 gm. of potassium persulfate and 1 ml. of 30% ammonia in 60 gm. water is continually added in doses over a period of 6 hours (pH between 4 and 5). Two hours after the termination of the addition of the pre-emulsion, when the content of residual monomers is 1.3% by weight, 15 gm. of vinyl acetate are dosed in over a 1 hour period; and then the mixture temperature is maintained for another 3 hours at 80° C. Then the mixture is cooled and the pH value adjusted to 7. A stable dispersion, free of coagulates, with a very weak odor is obtained. The content of residual monomers was 0.2% by weight.

Example 7

The reaction is carried out as in Example 6; however, instead of adding 15 gm. of vinyl acetate, 15 gm. of vinyl propionate is dosed in. A stable, almost odorless dispersion is obtained whose content of residual monomers is 0.25% per weight.

Example 8

In a reaction vessel, as described in Example 1, 3 gm. of "Mersolat K 30," gm. of a nonylphenolpolyethylene glycol with 23 mols of ethylene oxide, 1.5 gm. of t-butylhydroperoxide, 6 gm. of acrylic acid and 6 gm. of acrylamide are dissolved in 580 gm. of water. Air and oxygen are removed by passing a stream of nitrogen through the reaction vessel. Into this solution were stirred in 600 parts of a mixture of 40% by weight of styrene, 30% by weight of butyl acrylate and 30% by weight of diethylhexyl fumarate and heated to 60° C. As soon as the mixture temperature had reached 60° C. a solution of 0.7 gm. of sodium formaldehydesulfoxylate and 1 gm. of sodium carbonate in 60 gm. of water was added continuously over a period of 6 hours and the temperature of the reaction medium kept at 60° C. (pH value about 4.5). Five hours after the start of the polymerization the content of residual monomers had fallen to 1.0% by weight. Twenty gm. of vinyl acetate were added over one hour; and then the temperature was raised to 70° C. and maintained for another 2 hours. Then the mixture was cooled and the pH value adjusted to 7. The copolymer dispersion is practically odorless. The content of residual monomers was 0.15% by weight.

Example 9 (comparison)

In the same procedure as in Example 8, but without addition of vinylacetate an intensive smelling dispersion with a residual content of 0.7% by weight of monomers is obtained.

Example 10

The procedure is the same as in Example 6, but as monomer mixture in the reaction-kettle charge, 60 gm. of styrene and 60 gm. of propyl acrylate and in the preemulsion 240 gm. of styrene and 240 gm. of propyl acrylate are used. Following the after-polymerization with vinyl acetate a stable dispersion with a weak odor was obtained. The content of residual monomers is 0.2% by weight.

Example 11

In a reaction vessel as in Example 1, 3 gm. of "Mersolat K 30," 25 gm. of a nonylphenolpolyethylene glycol with 20 mols of ethylene oxide, 1 gm. of potassium persulfate, and 8 gm. of a hydroxyethylcellulose (viscosity of 100 cps. for the 2% aqueous solution) were dissolved in 580 gm. of water. Air and oxygen were removed by passing a nitrogen stream through the reaction vessel. A mixture of 60 gm. of styrene, 60 gm. of butyl acrylate and 0.5 gm. of dodecylmercaptan were then stirred in. Then the mixture is heated for 20 minutes until the mixture temperature had reached 70° C. At this point a mixture of 240 gm. of styrene and 240 gm. of butyl acrylate is dosed into the mixture continuously for 3 hours. The temperature of the reaction medium is kept at 70° C. Simultaneously with the dosing in of the monomers, the dosing of 1.5 gm. potassium persulfate and 2 gm. of sodium phosphate in 60 gm. water is started which is continued over a period of 6 hours (pH value between 4 and 5). Two hours after the end of the addition of the monomer mixture, the content of monomers in the reaction medium has fallen to 1.0% by weight. Within a 1 hour period 10 gm. of vinyl acetate are added. The temperature is then raised to 85° C. for another 3 hours with addition of 0.5 gm. of potassium persulfate in 20 gm. of water. The content of residual monomers of the cooled dispersion was 0.2% by weight. The dispersion is almost odorless. Under the same conditions, but without addition of vinyl acetate the content of residual monomers amounts to 0.7% by weight. The dispersion has then a strong specific odor.

Example 12

In an apparatus, as described in Example 1, 4 gm. of "Mersolat K 30," 30 gm. of isotridecylpolyethylene glycol with 15 mols of ethylene oxide, 1 gm. of vinyl sulfonate, 1.8 gm. of potassium persulfate, 9 gm. of acrylic acid and 6 gm. of acrylamide are dissolved in 580 gm. of water. Air and oxygen are removed by passing a nitrogen stream through the apparatus. Into this solution a mixture of 250 gm. of styrene, 150 gm. of butyl acrylate and 200 gm. of 2-ethylhexyl acrylate is stirred; and the mixture is heated to 65° C. After reaching the temperature of 65° C., the addition of 1 gm. of sodium bisulfite in 70 ml. water is started and continued over a period of 5 hours. The mixture temperature is kept at 65° C. Subsequently it is raised to 85° C. After 1 hour the content of residual monomers is 1.3% by weight. The pH value is adjusted by addition of ammonia to 4.5; 10 gm. of vinyl acetate and 0.5 gm. of ammonium persulfate are added and the temperature is maintained for another 2 hours at 85° C. After cooling a finely divided, stable dispersion, free of coagulates, is obtained that is almost odorless. The content of residual monomers is 0.25% by weight.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A process for the preparation of an aqueous dispersion of styrene/acrylate ester mixed polymers substantially free of noxious odors consisting essentially of the steps of polymerizing an initial mixture of from 20% to 70% by weight of styrene monomer and from 80% to 30% by weight of a monomer component consisting of from 40% to 100% by weight of acrylic acid esters with alkanols having 1 to 18 carbon atoms, from 0 to 60% by weight of diesters of alkenedioic acids having 4 to 8 carbon atoms with alkanols having 1 to 18 carbon atoms, and from 0 to 5% by weight of water-soluble $\alpha,\beta$-unsaturated monomers copolymerizable with said styrene and said acrylic acid esters, in the presence of water and dispersants selected from the group consisting of emulsifiers, protective colloids and mixtures thereof, under free-radical polymerization conditions at temperatures of from 0° C. to 100° C., for a time sufficient for the residual monomer content to fall below 3% by weight of the initial monomer content, thereafter adjusting the pH to between 3 and 7 and adding from 0.2% to 10% by weight, based on the weight of the polymerizate, of a vinyl ester of an alkanoic acid having 1 to 3 carbon atoms, after-polymerizing the mixture at a temperature of from 50° C. to 100° C. for a time sufficient to reduce said residual monomer content below 0.35% by weight, and recovering said aqueous dispersion of styrene/acrylate ester mixed polymers substantially free of noxious odors.

2. The process of claim 1, wherein the copolymerization temperature ranges from 40–90° C.; and wherein the after-polymerization temperature ranges between 75–90° C.

3. The process of claim 2, wherein the said alkanols have 2 to 8 carbon atoms.

4. The process of claim 3, wherein the determination step is to determine when the residual monomer content has fallen below 2% by weight of the initial total monomer amount.

5. The process of claim 4, wherein the added amount of the vinyl ester of alkanoic acids having 1 to 3 carbon atoms is from 0.5–4% by weight based on the polymerizate.

6. The process of claim 5, wherein the diester of alkenedioic acids having 4 to 8 carbon atoms is a member selected from the group consisting of fumaric acid diester, maleic acid diester, and itaconic acid diester.

7. The process of claim 6, wherein the water soluble α,β-unsaturated copolymerizable monomer is selected from the group consisting of acrylic acid, methacrylic acid, acrylamide, methacrylamide, N-methylolacrylamide, N-methylolmethacrylamide, vinyl sulfonic acid, fumaric acid, maleic acid, itaconic acid, half esters of these acids, half amides of these acids, mixtures of these acids, and the water soluble salts of these acids.

References Cited

UNITED STATES PATENTS

| | | | |
|---|---|---|---|
| 3,513,120 | 5/1970 | Pohleman et al. | 260—29.6 TA |
| 3,692,726 | 9/1972 | Oehmichen | 260—29.6 TA |

WILLIAM H. SHORT, Primary Examiner

L. M. PHYNES, Assistant Examiner

U.S. Cl. X.R.

260—29.6 RB, 29.6 RW, 29.6 T, 885